United States Patent
Alexander et al.

(10) Patent No.: US 8,375,353 B2
(45) Date of Patent: Feb. 12, 2013

(54) ENABLING THE USE OF PROCESS FLOW APPLICATIONS WITHIN AN INFORMATION MANAGEMENT SYSTEM (IMS)

(75) Inventors: William Alexander, Providence, RI (US); Shyh-Mei F. Ho, San Jose, CA (US); Jenny C. Hung, San Jose, CA (US); Cynthia F. Krauss, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 12/649,775

(22) Filed: Dec. 30, 2009

(65) Prior Publication Data
US 2011/0161919 A1  Jun. 30, 2011

(51) Int. Cl.
*G06F 9/44* (2006.01)
*G06F 9/45* (2006.01)
(52) U.S. Cl. .................... 717/105; 717/104; 703/22
(58) Field of Classification Search .............. 717/105
See application file for complete search history.

(56) References Cited

U.S. PATENT DOCUMENTS

| | | | | |
|---|---|---|---|---|
| 5,812,849 | A * | 9/1998 | Nykiel et al. | 717/101 |
| 6,983,468 | B1 * | 1/2006 | Green et al. | 703/22 |
| 7,805,713 | B2 * | 9/2010 | Patel | 717/106 |
| 8,250,531 | B2 * | 8/2012 | Bolene et al. | 717/120 |

OTHER PUBLICATIONS

Barker et al., "The Benefits of Service Choreography for Data-Intensive Computiing," ACM, 2009, 10pg.*
Kloppmann et al., "Business process choreography in WebSphere: Combining the power of BPEL and J2EE," IBM, 2004, 27pg.*

* cited by examiner

*Primary Examiner* — Li B Zhen
*Assistant Examiner* — Ryan Coyer
(74) *Attorney, Agent, or Firm* — Patents On Demand P.A.; Brian K. Buchheit; Scott M. Garrett

(57) ABSTRACT

An IMS process flow toolset can be used to create an IMS process flow application. The IMS process flow application can include an IMS process flow control program. The IMS process flow control program can embody process flow elements such as business logic and events as well as communication with external non-IMS applications. Both the IMS process flow application and IMS process flow control program can be run within the IMS.

18 Claims, 3 Drawing Sheets

Sample IMS Process Flow 200

Sample IMS Process Flow Control Program Code 400

```
405    PROCEDURE DIVISION.

410    { ENTRY 'DLITCBL' USING IOPCB.
       { MOVE "$$" TO IO-STATUS.

* Get input message from message queue
415    CALL 'CBLTDLI' USING GU, IOPCB, INPUT-AREA.

* Make synchronous callout request and get response
420    PERFORM ICAL-SENDRECV THRU ICAL-SENDRECV-END.

* Check conditional logic expressed in model
425    IF ICAL-RESPMSG = SPACES
430        PERFORM COMP-LOGIC THRU COMP-LOGIC-END.

* Insert output message back to IOPCB
435    CALL 'CBLTDLI' USING ISRT, IOPCB, OUTPUT-AREA.

440    STOP RUN.
```

FIG. 4

ENABLING THE USE OF PROCESS FLOW APPLICATIONS WITHIN AN INFORMATION MANAGEMENT SYSTEM (IMS)

BACKGROUND

The disclosure relates to the field of process flow applications and, more particularly, to enabling the use of process flow applications within an IMS.

A process flow application is a composite business program choreographing data exchanges between service blocks, representing the various software applications that participate in an electronic business process. These various software applications represented by the service blocks often operate on different platforms and/or from different network locations (i.e., external to the business network). Process flow applications provide a high-level approach for managing business process across multiple, disparate software systems.

One software system central to the performance of many business processes is an information management system (IMS). However, use of IMS within a conventional process flow application is prohibitive. Firstly, current process flow generation tools lack the ability to handle function calls and/or data structures that are specific to conventional IMS implementations. This increases the time and cost of using IMS within a process flow application since that such code elements would need to be added manually by application developers.

A current approach to overcome this is to handle the invocation of IMS applications as service components and not as complete service blocks. That is, instead of being able to pass the IMS application a set of input data for it to perform calculations upon and receive a final set of output data, the input and output is exchanged for each step or calculation performed. This increases the quantity of calls required to the IMS application to complete the step of the process flow. Each call to the IMS application requires an independent network request and response, increasing the network overhead and decreasing performance of the process flow application.

Another prohibitive factor is the interaction of IMS applications with external servers and business systems. Programming logic must be manually added to IMS applications in order to ensure proper communication with external servers, which may be running on a different platform. The manual addition of more code is required for the IMS application to support other business systems, such as business logic implementation, event processing, exception handling, and compensation logic. Because of the manual nature of these activities coupled with the lack of an IMS process flow tool, it would be a costly and time-consuming undertaking for an organization to modify their library of IMS applications.

BRIEF SUMMARY

One aspect of the disclosure can include an information management system (IMS) software flow toolset for developing IMS process flow applications executable within an IMS environment. The IMS software flow toolset can include an IMS process flow choreographer, an IMS control program generator, and an IMS source code editor. The IMS process flow choreographer can be used for visually designing and defining process flow elements of an IMS process flow application. The IMS control program generator can generate an IMS process flow control program from the flow elements and their connections as defined through the IMS process flow choreographer. The IMS process flow program can be a discrete component of the IMS process flow application. Bindings between the IMS process flow application and service components executably coupled to the IMS process flow application can be defined in the IMS process flow control program. The IMS source code editor can be for creating, editing, and saving source code of the IMS process flow application. The source code editor is able to at least view and edit code of the IMS process flow control program generated by the IMS control program generator. The source code editor is also able to at least create, edit, and view source code of the IMS application other than code defined within the discrete component that is the IMS process flow application. The IMS can include a collection of programs for storing, organizing, selecting, modifying, and extracting data from a hierarchical model based database.

Another aspect of the disclosure can include an information management system (IMS) comprising a transaction management subsystem, a database manager subsystem, a systems services subsystem, and a set of IMS process flow applications. The transaction management subsystem can be for creating, executing, and managing transaction processing applications and for performing network management, message management, data communication, and security functions for the IMS. The database manager subsystem can be for querying and storing data in accordance with a hierarchical model and for performing data integrity and data recovery functions. The systems services subsystem can be for managing memory of the IMS, for command processing, and for inter system communications. The IMS process flow applications can be executable within the IMS. Each of the IMS process flow applications can include an IMS process flow control program. The IMS process flow program can be a discrete component of the IMS process flow application. Bindings between the IMS process flow application and service components executably coupled to the IMS process flow application can be defined in the IMS process flow control program. The service components can include an external service component that executes outside the IMS and that communicates to the IMS via the systems services subsystem.

Another aspect of the disclosure can include a business process application that can invoke an IMS process flow application within an IMS. The business process application can execute within a server remotely located from the IMS. Responsive to the invoking, the IMS process flow application can run within the IMS. The IMS process flow application while running can perform a set of process flow activities. A flow between the process flow activities can be defined within an IMS process flow control program. The IMS process flow program can be a discrete executable component of the IMS process flow application. Bindings between the IMS process flow application and externally implemented service components can be defined in the IMS process flow control program. The IMS process flow activities can execute in accordance with the IMS process flow control program. At least one of the process flow activities can be an external activity performed by a service component external to the IMS. Execution of the external activity can be dependent upon completion of a first internal activity, as defined by the IMS process flow control program. Execution of the first internal activity can complete. Execution of the external activity can be responsively triggered based on the completion of the first internal activity in accordance with the IMS process flow program. The IMS can receive an indication that the external activity has completed. Responsive to the indication, execution of another of the activities can be initiated. This activity can be dependent upon completion of the external activity in accordance with the IMS process flow program.

BRIEF DESCRIPTION OF THE SEVERAL VIEWS OF THE DRAWINGS

FIG. 4 is an example of sample IMS process flow control program code in accordance with embodiments of the inventive arrangements disclosed herein.

DETAILED DESCRIPTION

Figure 1:
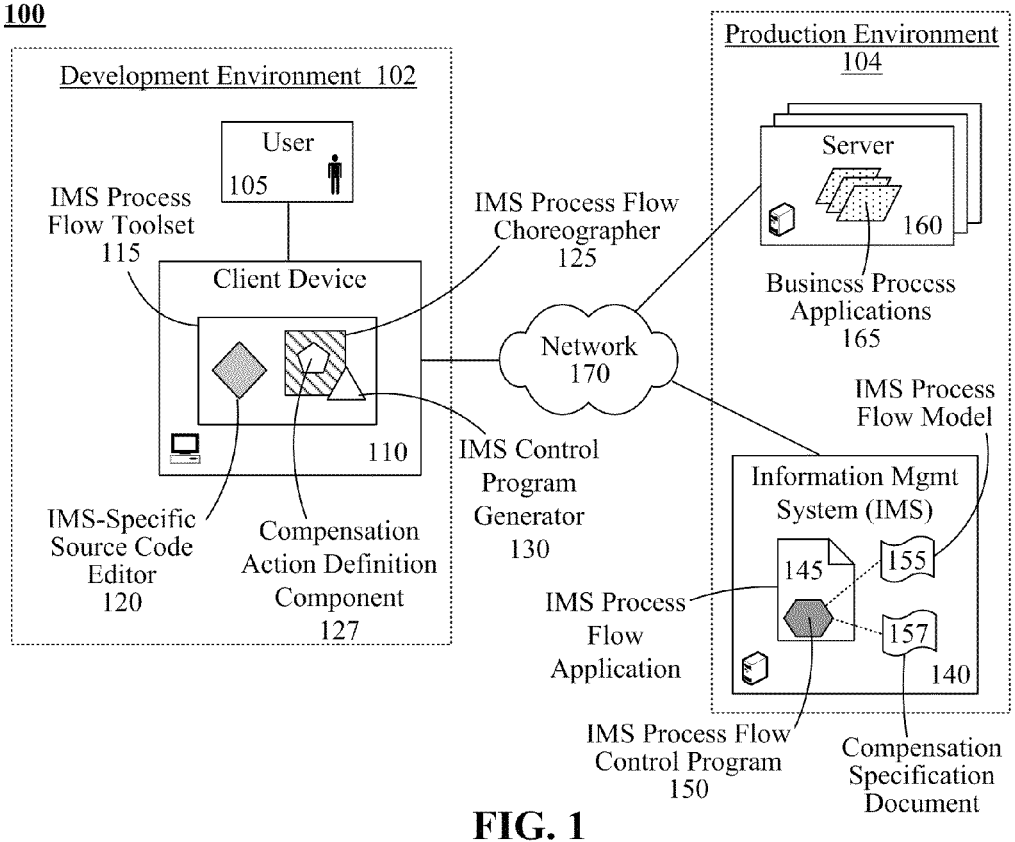
FIG. 1 is a schematic diagram illustrating a system that enables the use of IMS process flow applications within an information management system (IMS) in accordance with embodiments of the inventive arrangements disclosed herein.

The disclosure provides a solution that can enable the use of process flow applications within an information management system (IMS). An IMS process flow toolset can be used to create an IMS process flow application. The IMS process flow application can include an IMS process flow control program. The IMS process flow control program can embody process flow elements such as business logic and events as well as communication with external non-IMS applications. Both the IMS process flow application and IMS process flow control program can be run within the IMS.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a schematic diagram illustrating a system 100 that enables the use of IMS process flow applications 145 within an information management system (IMS) 140 in accordance with embodiments of the inventive arrangements disclosed herein. In system 100, a user 105 can utilize an IMS process flow toolset 115 running on a client device 110 to create an IMS process flow application 145 that runs within the IMS 140. That is, user 105 and client device 110 can perform function in a development environment 102. Server 160 and IMS 140 can be components of a production environment 104.

The IMS 140 can represent a computing system that supports data management and transaction activities. As shown in system 100, the IMS 140 can also be configured to communicate over a network 170 with an IMS process flow toolset 115 running on a client device 110 as well as business process applications 165 running on servers 160. Communications between device 110 and IMS 140 can occur during a software development phase of a software lifecycle, such as occurring during software 145 deployment. Communications between IMS 140 and server 160 can occur (in real-time or near real time) dynamically when executing application 165 or 145 in production environment 104.

The IMS process flow toolset 115 can represent a software development tool that can be used to create and/or modify an IMS process flow application 145. As shown in system 100, the IMS process flow toolset 115 can include an IMS-specific source code editor 120 and an IMS process flow choreographer 125.

The IMS-specific source code editor 120 can represent a software development environment tool that supports a set of programming languages, such as COBOL and JAVA, used by the IMS 140, providing features and functionality tailored for the IMS 140 environment. Within the IMS-specific source code editor 120, the user 105 can create/view/modify the source code of the IMS process flow application 145. For example, the IMS-specific source code editor 120 can offer the user 105 features commonly found in integrated development environments (IDEs) such as keyword coloration and syntax checking in relation to IMS 140.

In order to create an IMS process flow application 145, the user 105 can launch the IMS process flow choreographer 125 from within the IMS-specific source code editor 120. The IMS process flow choreographer 125 can represent the software component of the IMS process flow toolset 115 that allows the user 105 to visually design and define the process flow elements of the IMS process flow application 145.

For example, the IMS process flow choreographer 125 can allow the user 105 to add and connect graphical icons that represent the various service components, computations, business logic, data variables, and compensation activities of the business process being implemented. The service components expressed within the IMS process flow choreographer 125 can include components external to the IMS 140 such as business process applications 165 operating from other servers 160.

It should be noted that, while graphical tools exist for creating process flow applications, such a graphical tool does not currently exist for creating a process flow application that runs within an IMS 140 and utilizes IMS applications as complete service components.

The graphical configuration of elements created by the user 105 within the IMS process flow choreographer 125 can be captured as an IMS process flow model 155. Since the graphical elements of the IMS process flow model 155 cannot be directly utilized by the IMS 140, the IMS control program generator 130 can be invoked from the IMS process flow choreographer 125 to generate an IMS process flow control program 150. The IMS process flow control program 150 can represent the underlying software code that corresponds to the graphical elements expressed within the IMS process flow model 155. For example, branching within the IMS process flow model 155 can be represented as a conditional control structure within the IMS process flow control program 150.

The IMS control program generator 130 can be further configured to automatically generate code stubs and/or skeleton code (not shown) for establishing communication with the other external business process applications 165 over a network 170. The generated skeleton code can increase the ease of use of the IMS process flow toolset 115 for the user 105 by eliminating manual configuration of the required communication protocols.

Further, the software code for the IMS process flow control program 150 generated by the IMS control program generator 130 can also be viewed/edited within the IMS-specific source code editor 120.

As shown in system 100, the IMS process flow control program 150 can be contained within the IMS process flow application 145. In an alternate embodiment, the IMS process flow control program 150 can exist separate from, but associated with the IMS process flow application 145.

Thus, the IMS process flow application 145 can represent an IMS application that has been modified to accommodate process flow elements. The process flow elements of the IMS process flow application 145 can be defined within a corresponding IMS process flow model 155 and encoded within an IMS process flow control program 150.

As used herein, IMS 140 can be a collection of programs for storing, organizing, selecting, modifying, and extracting data from a database. IMS 140 stores data using a hierarchical model (as opposed, for example, to a relational database model). IMS 140 can include a transaction management subsystem (not shown), a database manager subsystem (not shown), and a systems services subsystem (not shown). The transaction manager subsystem can create, execute, and manage transaction processing applications. The transaction management subsystem can also performing network management, message management, data communication, and security functions for the IMS 140. Transaction processing applications utilize transactions, which include the request and execution of a set of programs, performing administrative functions, and accessing a shared database. The IMS process flow application 145 can be a transaction processing application, which utilizes (is executed by) the transaction manager subsystem of the IMS 140.

The database manager subsystem can be for querying and storing data in accordance with a hierarchical model and for performing data integrity and data recovery functions. The IMS process flow application 145 can be a database processing application, which utilizes (is executed by) the database manager subsystem of the IMS 140.

The systems services subsystem can be for managing memory of the IMS, for command processing, and for inter system communications. Interactions between business process applications 165 and IMS process flow application 145 can occur through the system services subsystem.

In one embodiment (e.g., an IBM IMS V9 based one), the transaction manager subsystem can be integrated with external applications, such as LOTUS, WEBSPHERE MQ, and DB2 stored procedures. In the same embodiment, the database manager subsystem can be integrated with XQUERY, DB2Stored Procedures, WEBSPHERE INFORMATION INTEGRATOR CLASSIC FEDERATION, WEBSHPERE IMS DB UTILITY, and Customer Information Control System (CICS). The system services subsystem can use a JAVA Integrated connect to interface with TCP/IP Clients, a SOAP gateway, WEBSPHERE APPLICATION SERVER, and WEBSPHERE/RATIONAL tools. In one embodiment, the IMS process flow toolset 115 can interface with the IMS 140 via the JAVA Integrated connected component of the system services subsystem of IMS 140.

IMS 140 is organized hierarchically to: optimize storage and retrieval; to ensure integrity and recovery, to enable IMS 140 to be efficiently managed; to ease access from other environments; to provide Enterprise-class technology that is robust, secure, high performance, scalable, available, and manageable, to offer choice and flexibility in programming styles and languages; and to integrate well with existing and new investments in hardware, software and skills. In general, IMS 140 performs faster than rational database management systems (RDBMS) for the common tasks but may require more programming effort to design and maintain for non-primary duties. Often, a hierarchical (e.g., IMS 140), relational, and XML based databases can be integrated together as a storage solution, where IMS 140 database is used for mission critical and high performance tasks, relational storage is used for decision support and application productivity purposes, and XML is used as a business to business (B2B) standard for data interchange. Thus, IMS 140 is one of a set of complementary technology specific systems functioning as a core component of many Enterprise storage solutions. As such, use of IMS flow toolset 115 to ease interactions and linkages between IMS 140 and server 160 (which has traditionally been a manual endeavor) can greatly reduce software development and maintenance costs within an Enterprise.

IMS 140 can implement the hierarchical model using blocks of data known as segments. Each segment can contain several pieces of data, which are called fields. For example, a customer database may have a root segment (or the segment at the top of the hierarchy). Child segments may be added underneath another segment. Unlike other databases, you do not need to define all of the data in a segment to IMS. For example, a segment may be defined with a size of forty bytes but only define one field that is six bytes long as a key field that you can use to find the segment when performing queries. IMS will retrieve and save all forty bytes as directed by a program but may not understand (or be concerned with) what the other bytes represent.

In various implementations, the IMS 140 can be implemented as a full function database, a fast path database, and/or a high availability large database (HALDB). Full function IMS databases can have primary and secondary indexes, accessed using Data Language Interface (DL/I) calls from various application program, such as structure query language (SQL) calls to a relational database. Full function databases can have a variety of access methods, such as Hierarchical Direct (HDAM), Hierarchical Indexed Direct (HIDAM), Simple Hierarchical Indexed Sequential (SHISAM), Hierarchical Sequential (HSAM), and Hierarchical Indexed Sequential (HISAM). In one embodiment, a full function database can store data using virtual storage access method (VSAM) or overflow sequential (OSAM).

Fast Path databases are optimized for extremely high transaction rates. Data Entry Databases (DEDBs) and Main Storage Databases (MSDBs) are the two types of fast path databases. Neither provide any indexing.

A HALDB is an extension of IMS full function databases that provide better availability, better handling of extremely large data volumes, and, with IMS V9, online reorganization to support continuous availability. A HALDB can store in excess of 40 terabytes of data.

Network 170 can include any hardware/software/and firmware necessary to convey data encoded within carrier waves. Data can be contained within analog or digital signals and conveyed though data or voice channels. Network 170 can include local components and data pathways necessary for communications to be exchanged among computing device components and between integrated device components and peripheral devices. Network 170 can also include network equipment, such as routers, data lines, hubs, and intermediary servers which together form a data network, such as the Internet. Network 170 can also include circuit-based communication components and mobile communication components, such as telephony switches, modems, cellular communication towers, and the like. Network 170 can include line based and/or wireless communication pathways.

Figure 2:
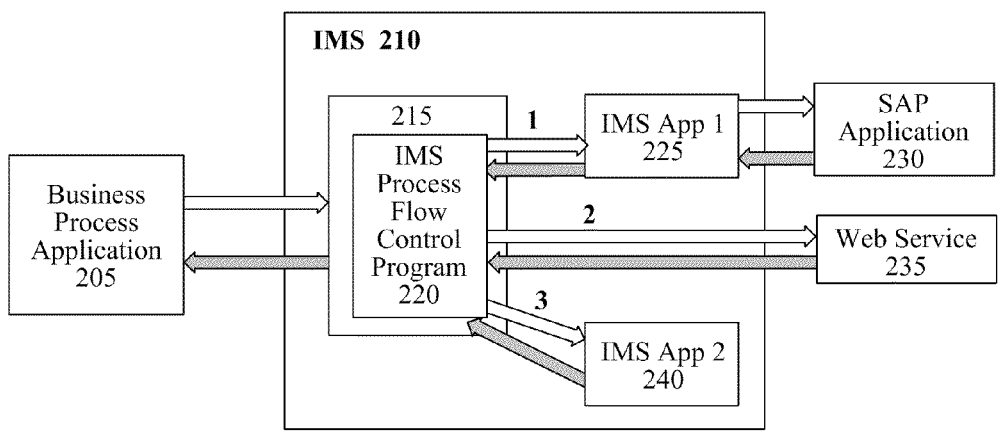
FIG. 2 is an illustration of a sample IMS process flow in accordance with an embodiment of the inventive arrangements disclosed herein.

FIG. 2 is an illustration of a sample IMS process flow 200 in accordance with embodiments of the inventive arrangements disclosed herein. Sample IMS process flow 200 can be performed within the context of system 100 or any other system supporting the enablement of IMS process flow applications.

In sample IMS process flow 200, a business process application 205 can invoke an IMS process flow application 215 within the IMS 210. As the IMS process flow application 215 runs, the IMS process flow control program 220 can be invoked to perform the process flow activities.

In this example, the sample IMS process flow 200 conducted by the IMS process flow control program 220 can perform three steps, as defined in the corresponding IMS process flow model. First, the IMS process flow control program 220 can invoke IMS App1 225. While the IMS process flow control program 220 waits for a response, IMS App1 225 can call a SAP application 230 for additional data and/or processing. SAP application 230 is an application conforming to the SAP solution platform by SAP Global Inc. of Walldorf, Germany. For example, the SAP application 230 can be an application executing within a SAP NETWEAVER BUSINESS WAREHOUSE management compliant system.

Once IMS App1 225 conveys a response to the IMS process flow control program 220, the next step of the sample IMS process flow 200 can be performed, calling a Web service 235. The IMS process flow control program 220 again waits for a response from the Web service 235 before performing the third step. The third step can invoke IMS App2 240. Upon receipt of a response from IMS App2 240, the IMS process flow control program 220 can convey the final response to the requesting business process application 205.

Communication between the IMS process flow control program 220 and the other applications of sample IMS process flow 200 can utilize a variety of standard methods supported by the IMS 210, such as advanced program-to-program (APPC), asynchronous program switch calls, synchronous application programming language (API) callouts, and the like. Communications external to the IMS 210 can be configured to utilize an intermediary message handler (not shown), such as IMS CONNECT.

As shown in this example, this approach can enable the IMS 210 to act such as a typical process flow application server. The IMS 210 can act as both the requestor of and the responder to the other IMS applications 225 and 240 and external applications 230 and 235.

It should also be noted that, through the IMS process flow control program 220, a composite of IMS transactions and external applications can be performed as a single unit of work, represented by the process flow expressed by the IMS process flow model. Further, this approach also provides the IMS process flow application 215 with the ability to handle business events, exceptions, and compensation activities, a capability not easily accommodated in current implementations of IMS 210 within process flow applications.

Figure 3:
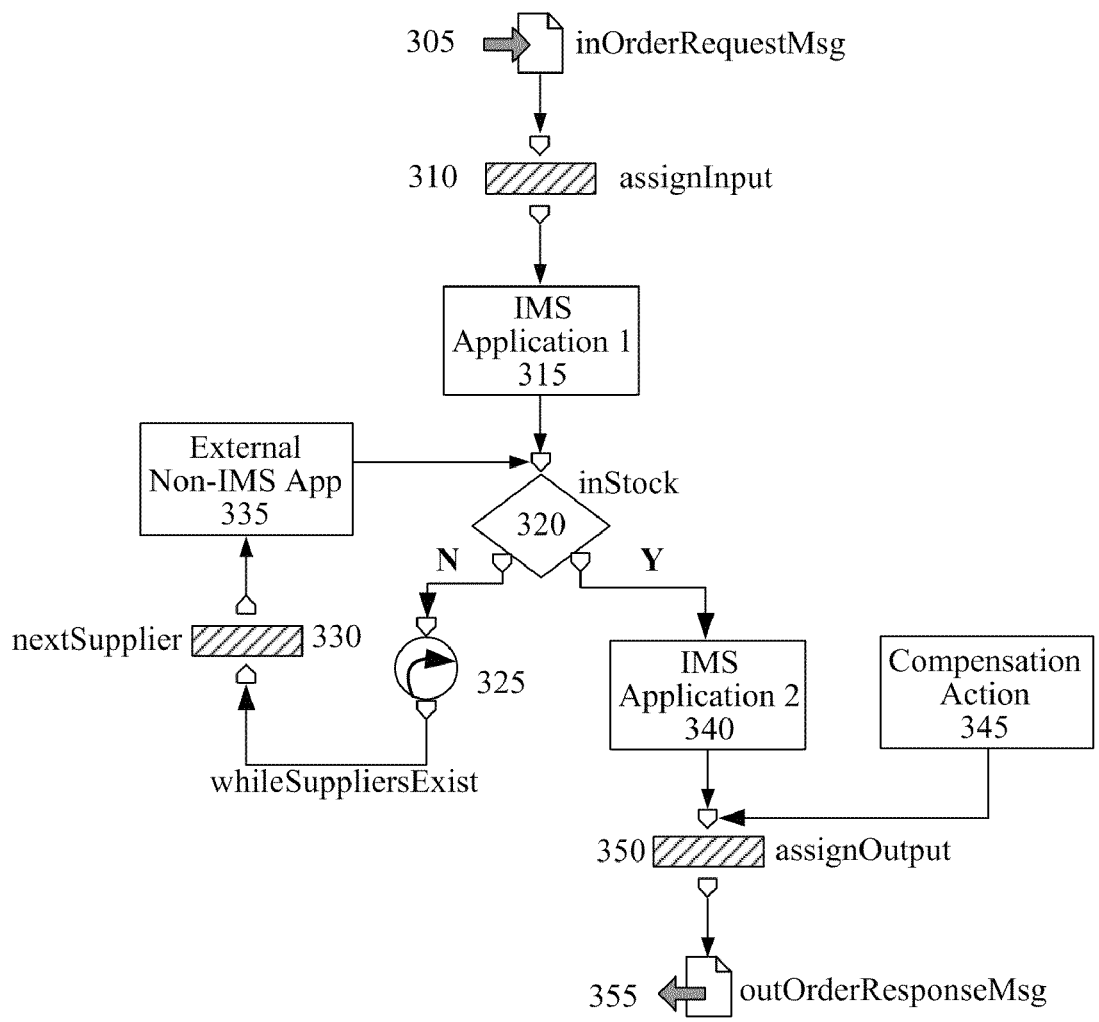
FIG. 3 is a sample IMS process flow model detailing a simple order handling process in accordance with an embodiment of the inventive arrangements disclosed herein.

FIG. 3 is a sample IMS process flow model 300 detailing a simple order handling process in accordance with embodiments of the inventive arrangements disclosed herein. Sample IMS process flow model 300 can be performed within the context of system 100 and/or the concepts expressed in sample IMS process flow 200.

Sample IMS process flow model 300 can include multiple graphical elements 305-355 that can be arranged to express relationships and business logics. The graphical elements 305-355 of the sample IMS process flow model 300 can be arranged utilizing the IMS process flow choreographer.

As shown in this example, the sample IMS process flow model 300 can begin with graphical element 305 representing the obtainment of an order request message. Graphical element 305 can be connected to graphical element 310 that assigns the data received in the order request message to local variables. Any additional data transformations or calculations can also be defined within graphical element 310.

From graphical element 310, an IMS Application 1 315 can be called to perform one or more processing activities, such as retrieving available information about the requested item. When processing by the IMS Application 1 315 is complete, flow can proceed to a graphical element 320 representing business logic that can determine if enough of the requested item is in stock to satisfy the order.

The sample IMS process flow model 300 can now branch based upon the evaluation of graphical element 320. When the requested item is not in stock, flow can proceed to graphical element 325. Graphical element 325 can represent a looping control mechanism that can continue to loop until it runs out of suppliers to check. While there are suppliers to check, the actions represented by graphical elements 330 and 335 can be performed.

Each time the loop represented by graphical element 325 is performed, graphical element 330 can get the identity of the next supplier and pass the identity to the external non-IMS application 335. The external non-IMS application 335 can perform its defined actions, such as querying the identified next supplier for their available quantity of the requested item, and return flow back to the business logic of graphical element 320.

When the requested item is in stock, flow can proceed by invoking IMS Application 2 340 to perform the next processing step, such as initiating the order fulfillment process. IMS Application 2 340 can then pass the data to graphical element 350 for the assignment of output data.

Additionally, a compensation action 345 can also be defined to pass data to graphical element 350. In this example, the compensation action 345 can represent a refund process for a cancelled order. Once graphical element 350 has completed assigning data to the output variables, an order response message can be generated and sent by graphical element 355.

It should be emphasized that creation of a sample IMS process flow model 300 is not supported by current software tools used to create process flow applications and/or IMS applications.

FIG. 4 is an example of sample IMS process flow control program code 400 in accordance with an embodiment of the inventive arrangements disclosed herein. The sample IMS process flow control program code 400 can be utilized within the context of system 100, the sample IMS process flow 200, and/or in conjunction with an IMS process flow model, such as sample IMS process flow model 300.

It should be noted that the sample IMS process flow control program code 400 can be authored in one of a variety of programming languages and utilize application programming interfaces (APIs) that are supported by the IMS. Further, sample IMS process flow control program code 400 is for illustrative purposes only, and is not intended to express a complete implementation or limitation of an embodiment of the present invention.

The sample IMS process flow control program code 400 can begin with a procedure declaration at line 405. Grouping 410 can represent two lines of code that initialize local variables. Line 415 can represent a typical call statement for retrieving an input message from the IMS message queue using the COBOL-to-DLI (CBLTDLI) interface library, the 'GET UNIQUE' (GU) function, and the input/out program control block (IOPCB). The retrieved message can be stored in the dataspace defined as INPUT-AREA.

A synchronous callout can then be made in line 420 utilizing a procedure encapsulated by 'ICAL-SENDRECV' and 'ICAL-SENDRECV-END'. The business logic expressed in the IMS process flow model associated with the sample IMS process flow control program code 400 can be represented by the conditional IF-statement of line 425. Should the called procedure return a blank response message, line 430 can call the 'COMP-LOGIC' procedure to perform the defined compensation activity.

An output message can be returned to the original PCB using the call statement defined in line 435. The 'INSERT' (ISRT) function can be used with the CBLTDLI interface library to return the contents of the 'OUTPUT-AREA' to the IOPCB. Line 440 can signal the termination of the sample IMS process flow control program code 400.

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An information management system (IMS) software flow toolset for developing IMS process flow applications executable within an IMS environment, said IMS software flow toolset comprising a computer program product stored in a non-transitory storage medium able to be executed by a processor of computing equipment, said IMS software flow toolset comprising:

an IMS process flow choreographer for visually designing and defining process flow elements of an IMS process flow application;

an IMS control program generator for generating an IMS process flow control program from the flow elements and their connections as defined through the IMS process flow choreographer, wherein the IMS process flow program is a discrete component of the IMS process flow application, wherein bindings between the IMS process flow application and service components executably coupled to the IMS process flow application are defined in the IMS process flow control program; and an IMS source code editor for creating, editing, and saving source code of the IMS process flow application, wherein the source code editor is able to at least view and edit code of the IMS process flow control program generated by the IMS control program generator and is able to at least create, edit, and view source code of the IMS application other than code defined within the discrete component that is the IMS process flow application, wherein said IMS comprises a collection of programs for storing, organizing, selecting, modifying, and extracting data from a hierarchical model based database, and wherein IMS process flow applications generated by the toolset run entirely within the IMS environment as a service component of the IMS environment, wherein at least one service component linked to the IMS process flow application is unable to natively run within the IMS environment and when triggered during execution of one of the IMS process flow applications runs outside the IMS environment.

2. The toolset of claim 1, said IMS process flow choreographer further comprising:
a plurality of graphical icons that a user is able to interactively connect and add to a project from which the IMS software flow toolset generates a corresponding IMS process flow application, wherein said graphical icons represent service components comprising service components internal to the IMS environment and service components external to the IMS environment.

3. The toolset of claim 1, wherein one of the service components bound to the IMS process flow application via the IMS process flow control program is a Web service, which is unable to execute natively within the IMS environment.

4. An information management system (IMS) comprising:
a processor, coupled to a memory;
a transaction management subsystem for creating, executing, and managing transaction processing applications and for performing network management, message management, data communication, and security functions for the IMS;
a database manager subsystem for querying and storing data in accordance with a hierarchical model and for performing data integrity and data recovery functions;
a systems services subsystem for managing memory of the IMS, for command processing, and for inter system communications; and
a plurality of IMS process flow applications executable within the IMS, wherein each of the IMS process flow applications comprise an IMS process flow control program, wherein the IMS process flow program is a discrete component of the IMS process flow application, wherein bindings between the IMS process flow application and service components executably coupled to the IMS process flow application are defined in the IMS process flow control program, wherein the service components comprise external service component that execute outside the IMS and that communicate to the IMS via the systems services subsystem, wherein IMS process flow applications entirely within the IMS environment as a service component of the IMS environment, wherein at least one service component linked to the IMS process flow application is unable to natively run within the IMS environment and when triggered during execution of one of the IMS process flow applications runs outside the IMS environment, and wherein each of the transaction management subsystem, the database manager subsystem, and the systems services subsystem comprise at least one computer program product stored in a tangible storage medium able to be executed by a processor of computing equipment.

5. The information management system of claim 4, wherein said IMS functions as a process flow application server to dispatch composite business application requests, wherein said composite business application requests comprise natively executing IMS applications, business events, and external non-IMS applications residing on enterprise and distributed systems.

6. The information management system of claim 4 further comprises:
an information management system (IMS) software flow toolset for developing IMS process flow applications executable within the IMS, said IMS software flow toolset comprising a computer program product stored in a tangible storage medium able to be executed by a processor of computing equipment.

7. The information management system of claim 6, wherein said IMS software toolset further comprises:
an IMS process flow choreographer for visually design and define process flow elements of an IMS process flow application; and
an IMS control program generator for generating an IMS process flow control program from the flow elements and their connections as defined through the IMS process flow choreographer, wherein the IMS process flow program is a discrete component of the IMS process flow application, wherein bindings between the IMS process flow application and service components executably coupled to the IMS process flow application are defined in the IMS process flow control program.

8. The information management system of claim 6, wherein said IMS software toolset further comprises:
an IMS source code editor for creating, editing, and saving source code of the IMS process flow application, wherein the source code editor is able to at least view and edit code of the IMS process flow control program generated by the IMS control program generator and is able to at least create, edit, and view source code of the IMS application other than code defined within the discrete component that is the IMS process flow application.

9. A method for using an information management system (IMS) as a flows process application server comprising:
a business process application invoking an information management system (IMS) process flow application within an IMS, wherein the business process application is executing within a server remotely located from the IMS;
responsive to the invoking, running the IMS process flow application within the IMS;
the IMS process flow application while running performing a plurality of process flow activities, wherein a flow between the process flow activities is defined within an IMS process flow control program, wherein the IMS process flow program is a discrete executable component of the IMS process flow application, wherein bindings between the IMS process flow application and externally implemented service components are defined in the IMS process flow control program;
executing the IMS process flow activities in accordance with the IMS process flow control program, wherein at least one of the plurality of process flow activities is an external activity performed by a service component external to the IMS, wherein execution of the external activity is dependent upon completion of a first internal activity, as defined by the IMS process flow control program, and wherein IMS process flow applications run entirely within the IMS environment as a service component of the IMS environment, wherein at least one service component linked to the IMS process flow application is unable to natively run within the IMS environment and when triggered during execution of one of the IMS process flow applications runs outside the IMS environment;

completing execution of the first internal activity;

responsively triggering execution of the external activity in accordance with the IMS process flow program;

receiving an indication that the external activity has completed; and responsive to the indication, initiating execution of another of the plurality of activities, which is dependent upon completion of the external activity in accordance with the IMS process flow program.

10. The method of claim 9, wherein the external activity is performed by a software component which is unable to execute within the IMS.

11. The method of claim 9, wherein the external activity is a Web service.

12. The method of claim 9, further comprising:

within a user interface of an IMS software flow tool, visually designing and defining process flow elements of the IMS process flow application; and an IMS control program generator generating the IMS process flow control program from the flow elements and their connections as visually defined via the user interface.

13. The method of claim 12, wherein said user interface comprises a plurality of graphical icons that a user is able to interactively connect and add to a project from which the IMS software flow tool generates a corresponding IMS process flow application, wherein said graphical icons represent service components comprising service components internal to the IMS environment and service components external to the IMS environment.

14. A computer program product comprising a non-transitory computer readable storage medium having computer usable program code embodied therewith, the computer usable program code comprising:

computer usable program code operable to invoke, via a business process application, an information management system (IMS) process flow application within an IMS, wherein the business process application is executing within a server remotely located from the IMS;

computer usable program code operable to responsive to the invoking, run the IMS process flow application within the IMS;

computer usable program code operable to perform a plurality of process flow activities while the IMS flow application is running, wherein a flow between the process flow activities is defined within an IMS process flow control program, wherein the IMS process flow program is a discrete executable component of the IMS process flow application, wherein bindings between the IMS process flow application and externally implemented service components are defined in the IMS process flow control program;

computer usable program code operable to execute the IMS process flow activities in accordance with the IMS process flow control program, wherein at least one of the plurality of process flow activities is an external activity performed by a service component external to the IMS, wherein execution of the external activity is dependent upon completion of a first internal activity, as defined by the IMS process flow control program, and wherein IMS process flow applications run entirely within the IMS environment as a service component of the IMS environment, wherein at least one service component linked to the IMS process flow application is unable to natively run within the IMS environment and when triggered during execution of one of the IMS process flow applications runs outside the IMS environment;

computer usable program code operable to complete execution of the first internal activity;

computer usable program code operable to responsively trigger execution of the external activity in accordance with the IMS process flow program;

computer usable program code operable to receive an indication that the external activity has completed; and computer usable program code operable to, responsive to the indication, initiate execution of another of the plurality of activities, which is dependent upon completion of the external activity in accordance with the IMS process flow program.

15. The computer program product of claim 14, wherein the external activity is performed by a software component which is unable to execute within the IMS.

16. The computer program product of claim 14, wherein the external activity is a Web service.

17. The computer program product of claim 14, further comprising:

computer usable program code operable to visually design and define process flow elements of the IMS process flow application within a user interface of an IMS software flow tool; and computer usable program code operable to generate, via an IMS control program generator, the IMS process flow control program from the flow elements and their connections as visually defined via the user interface.

18. The computer program product of claim 17, wherein said user interface comprises a plurality of graphical icons that a user is able to interactively connect and add to a project from which the IMS software flow tool generates a corresponding IMS process flow application, wherein said graphical icons represent service components comprising service components internal to the IMS environment and service components external to the IMS environment.

* * * * *